UNITED STATES PATENT OFFICE 2,205,140

CATALYSTS AND PROCESS OF PREPARING THEM

Llewellyn Heard, Hammond, Ind., assignor to Standard Oil Company, Chicago, Ill., a corporation of Indiana No Drawing. Application December 17, 1937, Serial No. 180,302

7 Claims. (Cl. 23—236)

This invention relates to catalysts and their preparation and more specifically to the preparation of metal chromite catalysts by the decomposition of hydrated metal ammonium chromate crystals.

It is an object of my invention to provide a method of preparing magnesium and calcium chromite catalysts having a large surface area and which are extremely active. Another object is to provide magnesium and calcium chromite catalysts which are uniform and reproducible in physical properties and in catalytic activity. Further objects will become apparent from the following detailed description.

The metal chromite catalysts heretofore known in the art have been prepared by a variety of methods. One such method consists of adding just enough ammonium hydroxide to an aqueous solution containing a metal salt and chromic acid anhydride to form a precipitate of the metal ammonium chromate, which is then filtered off, washed, dried, and ignited to form the corresponding metal chromite. This ignition is generally carried out until the precipitate starts to decompose, and thereafter the decomposition is allowed to continue spontaneously, leaving a "glowing" residue.

The metal chromite catalysts obtained by this and other known methods are quite variable in composition, and particularly in physical structure, so that two consecutive batches of catalysts made by any of these methods do not have the same activity, probably because of the variations in surface area.

I have found that improved magnesium and calcium chromite catalysts, which are reproducible and which have very large surface areas, can be prepared by the decomposition of a hydrated magnesium or calcium ammonium chromate in crystal form, particularly the magnesium or calcium ammonium chromate hexahydrate.

According to my invention a hydrated magnesium or calcium ammonium chromate in crystal form, particularly a metal ammonium chromate hexahydrate having the general formula $$(NH_4)_2M(CrO_4)_2.6H_2O$$

where M represents a metal selected from the group consisting of magnesium and calcium, is decomposed by heating to a high temperature, which may range from about 200° C. to red heat. I may also use mixed crystals containing both of the above mentioned metals. The product resulting from this decomposition is a form of magnesium or calcium chromite characterized by a large surface area and great catalytic activity, consisting of black rigid solids in which the crystal structure of the hexahydrate is retained and which are particularly suitable for direct use as catalysts.

Although the magnesium and calcium chromites prepared in accordance with my invention are similar in physical characteristics and catalytic activity, I have found that magnesium ammonium chromate hexahydrate crystals form much more easily than the crystals of the corresponding calcium compound. In practicing my invention therefore I much prefer to use magnesium ammonium chromate hexahydrate crystals as the material from which to prepare my catalyst.

The crystalline hydrated magnesium or calcium ammonium chromate from which my catalyst is prepared may be obtained in a number of ways. In my preferred method of obtaining this material, however, aqueous solutions of a suitable salt of magnesium or calcium and ammonium chromate are mixed, preferably in approximately stoichiometric proportions, although an excess of the chromium compound may be used, and the solution is then allowed to stand until well-defined crystals of the hydrated magnesium or calcium ammonium chromate form. These crystals may be allowed to grow to a considerable size, and this is desirable so that the chromite produced by decomposition will be of suitable size for direct use as catalyst. The crystals are then filtered off, washed, and dried.

The decomposition step is carried out by heating these crystals until they have ceased to give off water and ammonia and are substantially completely decomposed. The temperature used is not critical but in general will be in the neighborhood of red heat. Both the crystallization and decomposition steps require only short periods of time, and I have prepared magnesium chromite suitable for immediate use as a catalyst in this way in less than two hours, which is a small fraction of the time usually required for catalyst preparation.

The catalysts prepared by my process may be used in a variety of reactions involving organic compounds, such as hydrogenation, dehydrogenation, oxidation, cracking, etc., and have been found particularly useful for the treatment of hydrocarbons, especially at high temperatures, such as the dehydrogenation of hydrocarbon liquids and gases, and the sweetening of petroleum naphthas. Magnesium and calcium chromites prepared according to my invention are suitable for use in the above reactions directly because of their rigidity. My catalysts may, of course, be mixed with other catalysts or inert materials.

The dehydrogenation of hydrocarbons in the presence of the catalysts described herein is claimed in my co-pending application Serial No. 182,855, filed December 31, 1937.

I contemplate as a part of my invention all equivalents and modifications within the spirit thereof, and desire to be limited only by the following claims.

I claim:

1. The process of preparing a metal chromite catalyst which comprises decomposing at an elevated temperature a crystalline material selected from the group consisting of magnesium ammonium chromate hexahydrate and calcium ammonium chromate hexahydrate.

2. The process of preparing a magnesium chromite catalyst in the form of black rigid solids which comprises decomposing magnesium ammonium chromate hexahydrate crystals at an elevated temperature.

3. The process of preparing a calcium chromite catalyst in the form of black rigid solids which comprises decomposing calcium ammonium chromate hexahydrate crystals at an elevated temperature.

4. A metal chromite catalyst produced by the decomposition at an elevated temperature of a crystalline material selected from the group consisting of magnesium ammonium chromate hexahydrate and calcium ammonium chromate hexahydrate.

5. A magnesium chromite catalyst produced by the decomposition of magnesium ammonium chromate hexahydrate crystals at an elevated temperature.

6. A calcium chromite catalyst produced by the decomposition of calcium ammonium chromate hexahydrate crystals at an elevated temperature.

7. A magnesium chromite catalyst consisting of black rigid solids produced by the decomposition of magnesium ammonium chromate hexahydrate crystals at a temperature above 200° C.

LLEWELLYN HEARD.